United States Patent [19]

Marier et al.

[11] Patent Number: 4,896,559
[45] Date of Patent: Jan. 30, 1990

[54] POSITION ADJUSTABLE VEHICLE STEERING CONTROL

[75] Inventors: Gregory J. Marier, Brooklyn Park, Minn.; Tommy O. Moats, Frederic, Wis.

[73] Assignee: Yamaha Hatsudoki Kabushiki Kaisha, Iwata, Japan

[21] Appl. No.: 198,856

[22] Filed: May 26, 1988

[51] Int. Cl.[4] ............................................. G05G 1/14
[52] U.S. Cl. ................... 74/551.4; 280/278; 280/279; 180/182; 74/530; 74/551.3; 403/97
[58] Field of Search ............... 74/63, 67, 68, 551.3, 74/551.4, 551.7, 551.2, 551.5, 531, 530; 180/182; 280/278, 279, 287; 403/97, 93, 94, 323, 374, 96, 330

[56] References Cited

U.S. PATENT DOCUMENTS

| | | | |
|---|---|---|---|
| 602,600 | 4/1898 | Green | 74/551.4 |
| 602,625 | 4/1898 | Fave | 74/551.4 |
| 622,490 | 4/1899 | Kelly | 74/551.4 |
| 624,643 | 5/1899 | Galor | 74/551.4 |
| 639,765 | 12/1899 | Phipps | 74/551.4 |
| 641,118 | 1/1900 | Kelly | 74/551.4 |
| 647,366 | 4/1900 | Blaker | 74/551.4 |
| 660,576 | 10/1900 | Justen | 74/551.4 |
| 3,863,521 | 2/1975 | Gatsos et al. | 74/551.4 |
| 4,023,436 | 5/1977 | Dodge | 74/551.3 |
| 4,361,057 | 11/1982 | Kochera | 74/551.4 |
| 4,384,497 | 5/1983 | Gatsos | 74/551.4 |
| 4,682,509 | 7/1987 | Takamiya et al. | 403/97 X |
| 4,688,817 | 8/1987 | Marier . | |
| 4,690,234 | 9/1987 | Takada | 180/182 |

FOREIGN PATENT DOCUMENTS

62639 3/1949 Netherlands ..................... 74/551.6

Primary Examiner—Vinh T. Luong
Attorney, Agent, or Firm—Orrin M. Haugen; Thomas J. Nikolai; Frederick W. Niebuhr

[57] ABSTRACT

A mechanism for adjusting vehicle handlebars includes a lower hub intergral with a vehicle steering column, and an upper hub formed as an integral part of the handlebars. Two opposed diamond-shaped plates rotationally receive both hubs. Two locking gears, one integral with each hub, form various interlocking engagement with one of the plates, corresponding to different handlebar position settings. A release lever, pivotally attached to one of the plates, is pivotable to urge the plates away from one another to release the locking engagment of the gears and projection groove, enabling movement of the handlebars to different settings. A spring loaded detent prevents inadvertent release of the mechanism, and must be moved against the force of a torsion spring prior to the pivoting of the release lever.

16 Claims, 4 Drawing Sheets

POSITION ADJUSTABLE VEHICLE STEERING CONTROL

BACKGROUND OF THE INVENTION

1. Field of the Invention

This invention relates to recreational vehicles, and more particularly to apparatus designed to afford adjustment of the handlebars or other steering members of such vehicles.

2. Description of the Prior Art

The use of position-adjustable steering controls in connection with automobiles, recreational vehicles and other steerable vehicles is well known. A vehicle with such equipment can accommodate various drivers differing in height, arm length, etc. The same individual, particularly in the course of a long drive, may enhance comfort by adjusting the vehicle steering wheel, handlebars or the like. Examples of adjustable handlebars for bicycles, motorcycles and the like are found in U.S. Pat. No. 3,863,521 (Gatsos), U.S. Pat. No. 4,023,436 (Dodge) and U.S. Pat. No. 4,361,057 (Kochera). Kochera in particular discloses drop style handlebars adjustable between a downward or racing position, and an upward position for touring or general use. Further in connection with bicycles, Netherlands Patent No. 62,639 (Audrain) shows upper and lower rotatable gears and a cable linkage between the gears which appears to maintain the orientation of the handlebars as they are adjusted.

A disadvantage of these pivotal mounting systems, however, is that the handlebars experience substantial rotation about a horizontal axis as they are adjusted upwardly or downwardly, or forwardly or rearwardly. As a result, the handlebars are moved out of a desired orientation, which is inconvenient and uncomfortable if any gauges, controls and the like that are mounted upon the handlebars are rotated out of their initial position.

In connection with snowmobiles, U.S. Pat. No. 4,688,817 (Marier) discloses an apparatus with upper and lower releasable pawl/cylinder connections to enable an operator to adjust the steering column angle and handlebar orientation independently, then lock them both simultaneously into place with a single lever. While suitable and convenient for vehicles such as snowmobiles having an extended steering column, this arrangement is not as advantageously employed for vehicles having shorter or covered steering columns.

Therefore, it is an object of the present invention to provide a means for adjusting the forward/rearward position of handlebars or other vehicle steering members without rotating them out of a preferred angular orientation.

Another object of the invention is to provide a means for quickly and conveniently adjusting the handlebar position to suit a variety of operators.

Another object is to provide a means for adjusting the forward to rearward position of recreational vehicle handlebars in a manner that preserves the visibility and/or accessibility of any gauges or controls mounted on the handlebars.

Yet another object is to provide a vehicle steering control which is position-adjustable, yet ruggedly secured against unintentional movement due to vibration, sudden impact, or the like.

SUMMARY OF THE INVENTION

To achieve these and other objects, there is provided an adjustable steering control apparatus for vehicles. The apparatus includes a first elongate steering member disposed on a longitudinal axis. A second steering member is mounted with respect to one end of the first steering member for pivoting relative to the first steering member about a transverse first axis. A third steering member is rotatably mounted with respect to the second steering member about a transverse second axis parallel to the first axis and relatively remote from the first steering member as compared to the first axis. The third steering member revolves about the first axis responsive to the pivoting of the second steering member. A linkage means joins the first steering member and the third steering member so as to rotate the third steering member relative to the second steering member responsive to the pivoting of the second steering member, and in a direction opposite to the direction of the pivoting. The amount of rotation of the third steering member is predetermined to maintain the third steering member in a selected orientation with respect to the first steering member as the third steering member revolves about the first axis. A releasable locking means is provided for substantially rigidly securing the first, second and third steering members against motion relative to one another.

Preferably, the first steering member is a cylindrical hub integral with the vehicle steering column, and the third steering member is a second hub, with the hubs concentric on the first and second axes, respectively. The second steering member has two spaced apart openings formed therethrough receiving respectively the hubs for relative rotational and axial movement. The linking means can be a gear integral with and surrounding the first hub, a second gear integral with and surrounding the second hub and an intermediate gear train drivingly associating the first and second gears. The intermediate gear train can be a single gear.

Alternatively, the linking means can be a cable wrapped about the first and second hubs.

The locking means can be a locking member associated with one or both of the hubs and integral with and surrounding at least one of the hubs. A plurality of locking teeth are formed in the locking member and project axially toward the locking plate. A plurality of locking grooves in the locking plate are positioned to receive the associated locking teeth responsive to axial movement of the hub and locking plate toward one another, thus to secure the hub and locking plate against relative rotation. A biasing means can be provided to urge the hub and locking plate into their locking engagement.

In one form of the invention, the locking means includes a stop plate mounted spaced apart and integral with the locking plate. A guide plate then is positioned between the locking plate and stop plate. The guide plate receives the first and second hubs for rotation and axial movement. Then, a spring under compression between the guide plate and stop plate biases the locking plate into locking engagement. A lever, mounted pivotally to the guide plate and with one end engaged with the locking plate, can be pivoted to move the locking plate out of locking engagement. Also, retaining rings are mounted on the first and second hubs between the guide plate and stop plate. The rings engage the guide plate as it moves transversely away from the locking plate, thus causing the hubs to move with the guide plate whereby they become disengaged from their locking position.

The hubs and guide apertures can be provided with similarly tapered surfaces, which in cooperation with a compression spring securely position the hub with respect to the guide plate. Finally, a thumb-actuated safety interlock ensures that the release lever cannot be actuated inadvertently.

In accordance with the present invention, the steering control can be adjusted forwardly and rearwardly without any change in the wrist angle, for increased operator comfort. Also, since acceleration, braking and other vehicle controls are designed to be accessible by hand near or on the handlebars, the ability to adjust the handlebar position without rotating them enhances operator control and convenience as well. The tooth engagement of the locking plate with the hubs gives the operator a tactile sense for the proper adjustment of the handlebars into one of a number of discrete positions, further enhancing the operator's sense of control and safety.

BRIEF DESCRIPTION OF THE DRAWINGS

For a further understanding of the above and other features and advantages, reference is made to the following detailed description, and drawings in which.

DETAILED DESCRIPTION OF THE PREFERRED EMBODIMENTS

Figure 1:
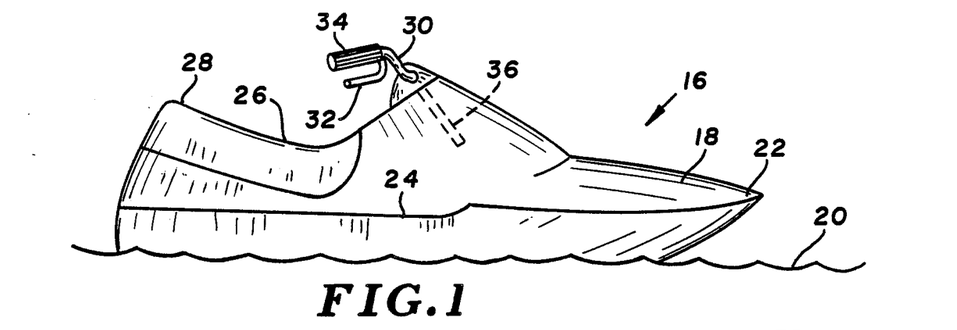
FIG. 1 is an elevational view of a recreational water vehicle equipped with an adjustable steering control constructed in accordance present invention.

Turning now to the drawings, there is shown in FIG. 1 a recreational vehicle 16 designed for use on lakes and other bodies of water. Vehicle 16 has a smooth hull 18 partially submerged in water 20 and tapered to form a nose 22 at the vehicle forward end. A substantially horizontal line at 24 indicates a horizontal deck or footrest along the right side of vehicle 16, and a similar footrest is provided on the left side. Between the footrests is an upwardly extending center rise 26. Typically the vehicle operator straddles rise 26 and positions one foot on each landing, from a sitting or standing position.

Vehicle 16 is motor-driven in a known manner not germane to the present invention and thus not discussed further. The direction of the vehicle is controlled with handlebars 30, with vehicle speed being controlled by a throttle control 32 mounted near a hand-gripped portion 34 of the handlebars on the right side of the vehicle. Handlebars 30 control the vehicle through a steering column 36 in the known manner.

To enhance operator convenience and comfort, it is desirable to mount handlebars 30 in a manner that permits the operator to adjust their position, forwardly or rearwardly, with respect to vehicle 16. Operators with longer reach, for example, tend to prefer a relatively forward position for the handlebars, and an operator's preferred seating position may vary depending upon whether a passenger is present.

While such adjustment can be provided by a simple pivot connection between the handlebars and steering column, such a connection rotates the handlebars as they are positionally adjusted. Various gauges and controls, among them throttle control 32, are often mounted integrally with the handlebars and therefore rotate along with any handlebar rotation. Adjustment of the handlebars thus moves such controls and gauges out of their preferred orientation. To eliminate this problem, there is shown in FIG. 2 a handlebar mounting device 38 for supporting handlebars 30 to enable their forward and rearward adjustment while preserving their angular position with respect to vehicle 16.

Figures 2, 3:
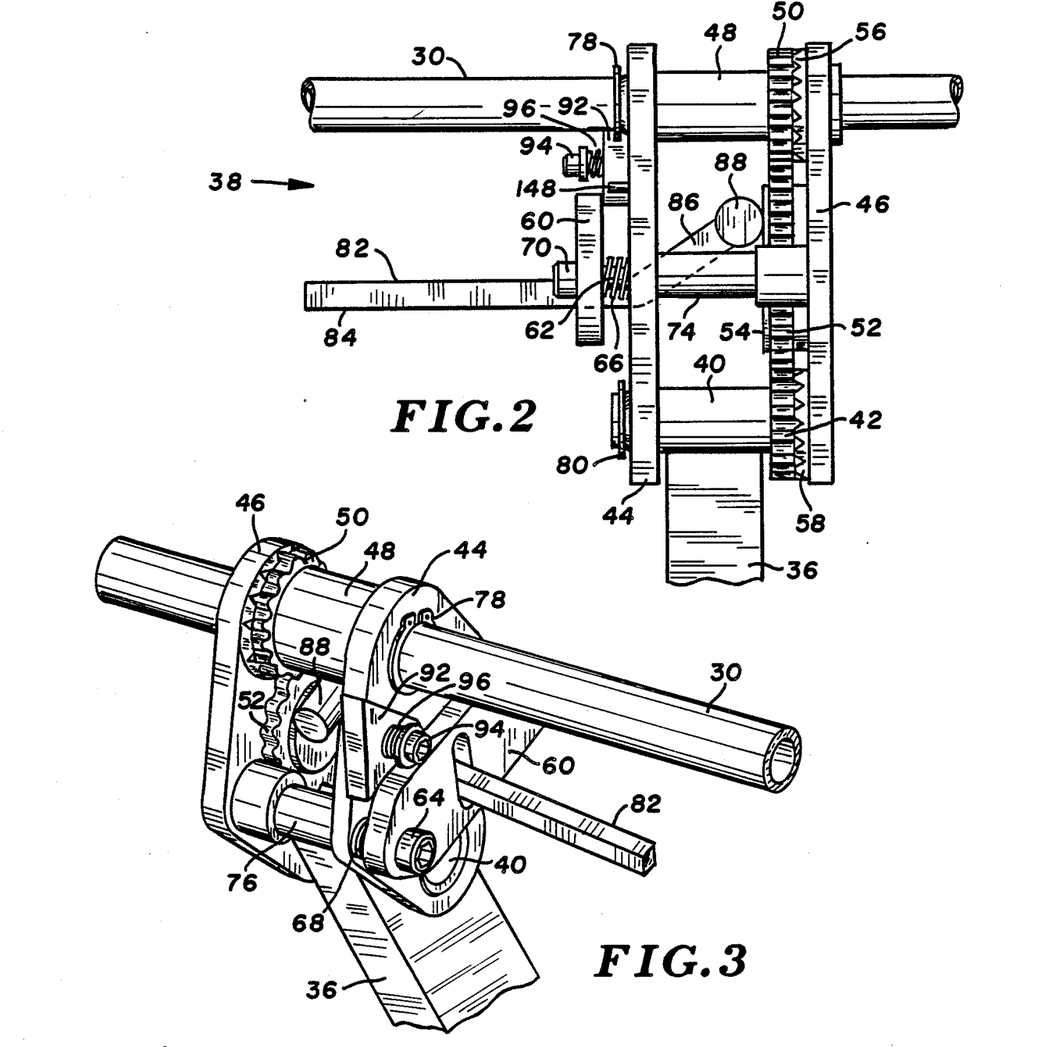
FIG. 2 is a partial front elevation taken from the front of the showing the steering control mechanism.
FIG. 3 is a perspective view taken from a position above and behind the steering control mechanism.
Figure 4:
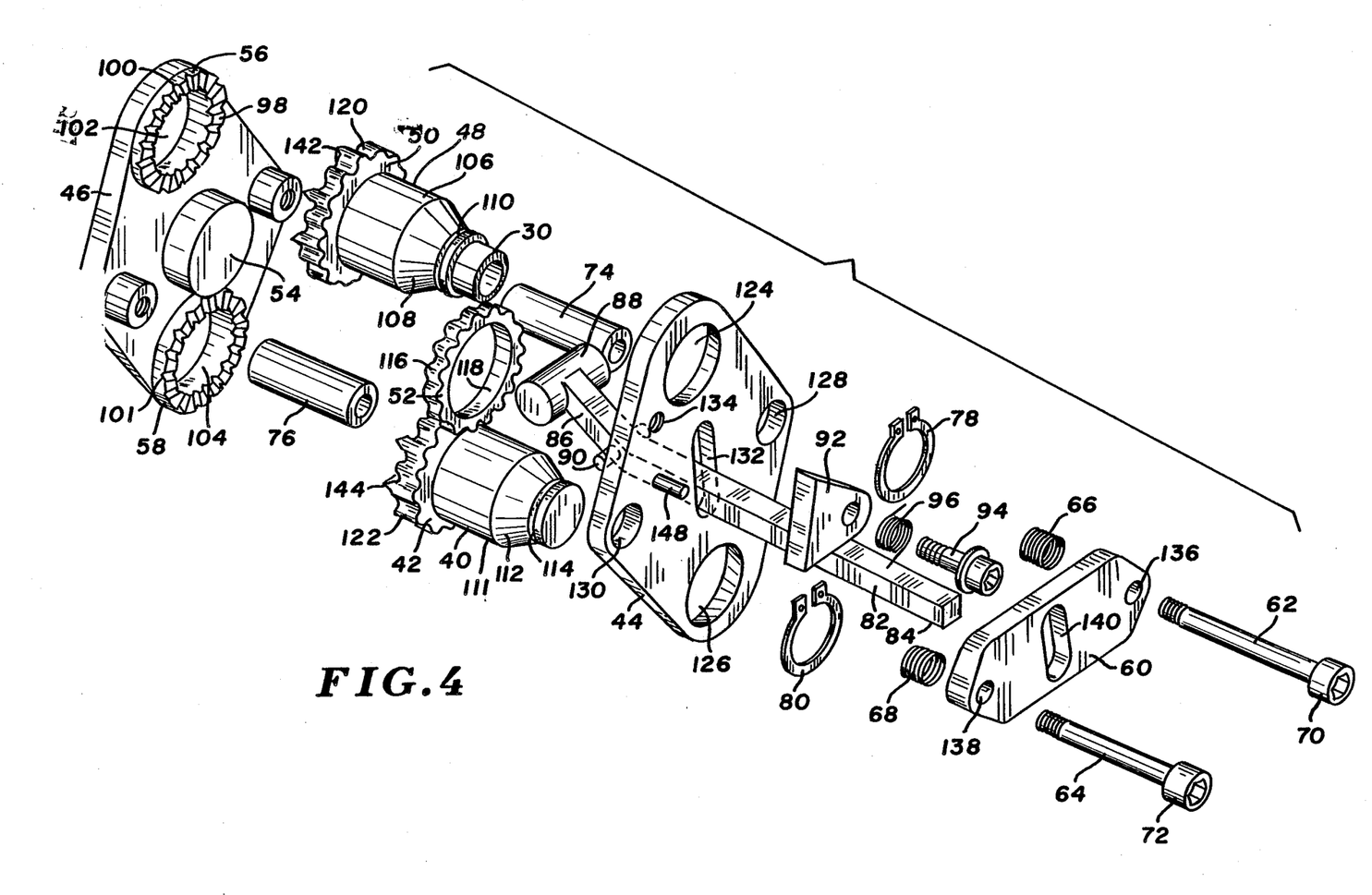
FIG. 4 is an exploded view of the parts comprising the mechanism.

With reference to FIGS. 2-4, the apparatus includes a lower, generally cylindrical hub 40 integral with steering column 36. A lower locking gear 42 integrally surrounds the lower hub near its right end as viewed in FIG. 2, i.e. from the front of vehicle 16. Two diamond-shaped plates, an actuator plate 44 and a locking plate 46, surround lower hub 40 and similarly surround an upper hub 48 formed as an integral, central portion of handlebars 30. Plates 44 and 46 preferably are die cast aluminum. An upper locking gear 50 is formed integrally with the upper hub, and a center connecting gear 52 drivingly engages the upper and lower locking gears. Center gear 52 is mounted on a cylindrical center projection 54 formed as an integral extension of locking plate 46. Similarly extended from the locking plate are upper and lower locking projections 56 and 58, respectively. The locking projections engage locking gears 42 and 50 to secure upper hub 48 and handlebars 30 against motion relative to lower hub 40 and the steering column.

The mounting device further includes a retaining plate 60 secured with respect to locking plate 46 by a pair of bolts 62 and 64 (FIG. 4) threadedly engaged with the locking plate. Compression springs 66 and 68 surround bolts 62 and 64 respectively between retaining plate 60 and actuator plate 44, and continually urge the retaining plate against heads 70 and 72 of bolts 62 and 64, respectively. Consequently retaining plate 60 tends to follow movement of locking plate 46, to the left or right as viewed in FIG. 2. Springs 66 and 68, in continually urging the retaining plate and actuator plate 44 apart from one another, also urge the locking plate toward the actuator plate or to the right as viewed in FIG. 2. Consequently, locking projections 56 and 58 are continually urged against locking gears 42 and 50, respectively. An assembly of sleeves 74 between the actuator plate and locking plate surrounds bolt 62. A similar sleeve assembly 76 surrounding bolt 64 is shown in FIG. 3.

Upper and lower retaining rings 78 and 80 are mounted on hubs 48 and 40, respectively on the side of actuator plate 44 opposite that of the upper and lower locking gears, and limit axial movement of the actuator plate with respect to the hubs.

As long as the locking gears and locking projections remain engaged under the force of springs 66 and 68, upper hub 48 is fixed with respect to lower hub 40 and handlebars 30 cooperate with steering column 36 to steer vehicle 16 in the usual manner. To positionally adjust handlebars 30, the operator first moves a locking detent 92 out of its locking position, then disengages the locking gears and locking projections, utilizing a release lever 82 pivotally mounted to the actuator plate. Release lever 82 includes an elongate leg 84 generally horizontal in FIG. 2, a stem 86 inclined upwardly of the leg, and a plastic pad 88 at the free end of the leg and in contact with center projection 54 of the locking plate. A pin 90 (FIG. 5) through release lever 82 mounts the lever pivotally with respect to the actuator plate.

Figure 5:
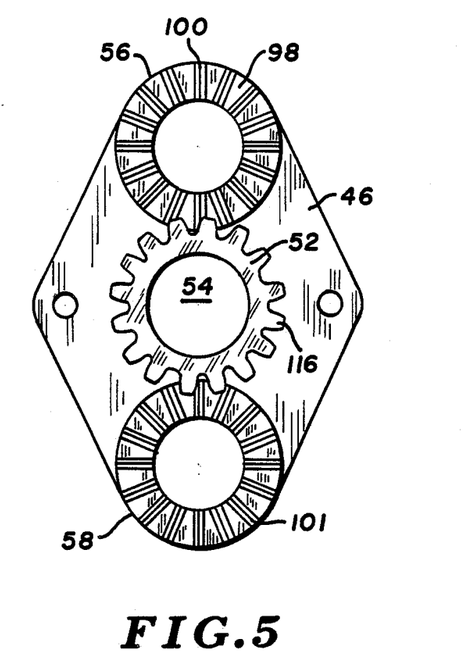
FIGS. 5-8 are elevational views of parts of the mechanism shown in FIG. 4.

When lever 82 is pivoted clockwise as viewed in FIG. 2, pad 88 and pin 90 cooperate to urge locking plate 46 and actuator plate 44 apart from one another, against the force of springs 66 and 68, until the locking gears and locking projections are disengaged, whereupon handlebars 30 may be adjusted to a desired position. To prevent inadvertent actuation of release lever 82, interlocking detent 92, mounted pivotally to the actuator plate by a bolt 94, is urged into an interlocking position between retaining plate 60 and actuator plate 44 as shown in FIG. 2 by a latch retaining torsion spring 96 (FIG. 5).

In FIG. 4, it is seen that locking plate 46 and actuator plate 44 are generally diamond-shaped. Each of the locking projections includes a series of flat landing portions 98 which together form a flat landing parallel to the major plane of locking plate 46. A series of radially directed, V-shaped grooves 100 are symmetrically formed about locking projection 56, with similar grooves 101 in gear 58. Circular openings 102 and 104 through locking projections 56 and 58, respectively, receive upper hub 48 and lower hub 40 respectively for rotation relative to the locking plate.

Upper hub 48 includes a cylindrical body 106 with a taper 108 converging in the direction away from locking gear 50. Beyond the taper is an annular groove 110 for receiving retaining ring 78.

Similarly, lower hub 40 includes a body 111, taper 112 and groove 114. Tapers 108 and 112 nest within correspondingly tapered actuator plate openings (FIG. 9) in the actuator plate, to provide good handlebar-to-steering column turning stiffness. Further, because the locking gears and locking projections prevent handlebar rotation when engaged, there is no need to rely on the center gear for this purpose. Accordingly, the center gear can be plastic if desired.

A plurality of teeth 116 are formed symmetrically about the perimeter of center gear 52, and a central opening 118 through the gear accommodates center projection 54, whereby gear 52 rotates with respect to the locking plate. Teeth 120 about the perimeter of upper locking gear 50, and teeth 122 about the perimeter of lower locking gear 42 correspond to teeth 116 of the center gear whereby the center gear and driving gears are in driving engagement. While the specific number of teeth is not critical in an of the gears, the upper and lower locking gears should have the same number of teeth.

Actuator plate 44 includes upper and lower hub openings 124 and 126 for receiving hub 48 and hub 40, respectively, for relative rotation. Opposite side openings 128 and 130 accommodate bolts 64 and 62. A vertical slot 132 is provided through the actuator plate to accommodate the pivoting of release lever 82.

The actuator plate further includes a threaded opening 134 to receive bolt 94 to mount interlock detent 92 and spring 96. Retaining plate 60 includes opposite side bores 136 and 138 for receiving bolts 64 and 62, and has a vertical slot 140 which, like slot 132 in the actuator plate, permits the necessary pivoting of the release lever.

FIG. 5 shows locking plate 46 with center gear 52 in its usual operating position about center projection or boss 54. Teeth 116 of the center gear overlap the perimeter of each locking projection for their driving engagement with teeth 120 and 122 of the upper and lower locking gears. In this arrangement the center gear and locking gears are vertically aligned, although such an alignment is not necessary for operation of the device.

Figure 6:
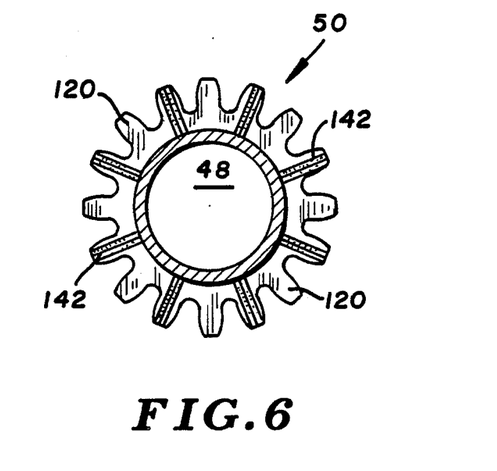

As seen in FIG. 6, eight locking teeth 142 are formed symmetrically about upper locking gear 50 and project away from the locking gear in the direction axially toward locking plate 46 (FIG. 4). The locking teeth have a V-shaped configuration and size corresponding to grooves 100. Locking teeth 144 of lower locking gear 42 are similarly constructed for engagement with grooves 101 of the lower locking projection. Consequently, whenever the locking teeth are at least approximately aligned with the locking grooves, springs 66 and 68 urge teeth 142 into grooves 100, and teeth 144 into grooves 101, to establish a rigid, locking engagement between the locking gears and locking projections. This prevents any rotation of hubs 40 and 48 relative to the locking plate.

Figure 7:
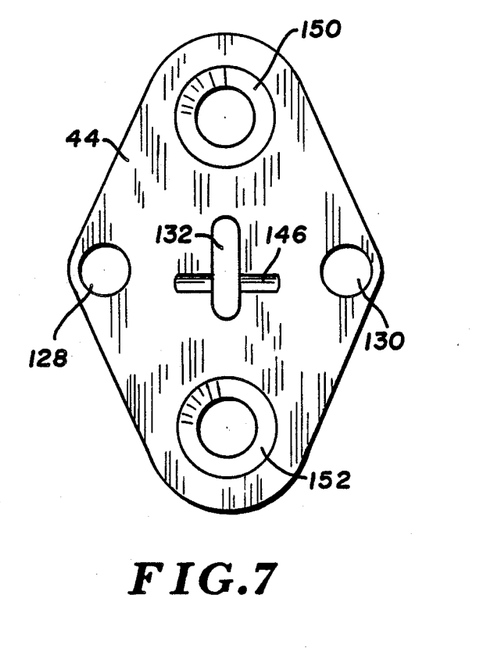

FIG. 7 illustrates the side of actuator plate 44 which faces locking plate 46, and further illustrates a horizontal groove 146 in the actuator plate, intersecting vertical slot 132. Groove 146 accommodates pin 90, particularly the exposed ends of the pin on the opposite sides of the release lever, to permit the required pivoting of the lever relative to the actuator plate.

Figure 8:
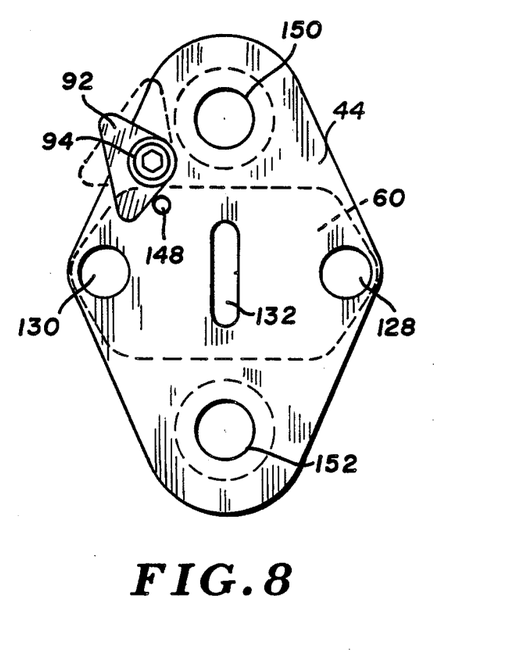

FIG. 8 shows the opposite side of actuator plate 44, and the lock and release positions of safety interlock detent 92. Retaining plate 60 is shown in broken lines to illustrate its position relative to the actuator plate. In the locking position, spring 96 urges detent 92 into the position shown in solid lines, against a stop 148 projected from the retaining plate a short distance toward the actuator plate. Just prior to adjusting the handlebars, the operator rotates detent 92 clockwise as viewed in FIG. 8, typically with the thumb of the right hand as the right hand is gripping the handlebars. The interlock is rotated clockwise until free of retaining plate 60 as indicated in broken lines, whereupon release lever 82 may be pivoted to bring the retaining plate closer to the actuator plate. With retaining plate 60 closer to the actuator plate, it holds detent 92 in its release position until the operator has adjusted the handlebars and releases lever 82, whereupon compression springs 66 and 68 urge the retaining plate and actuator plate apart with the locking gears and locking plate projections in alignment, and permit detent 92 to assume the locking position once again.

Figure 9:
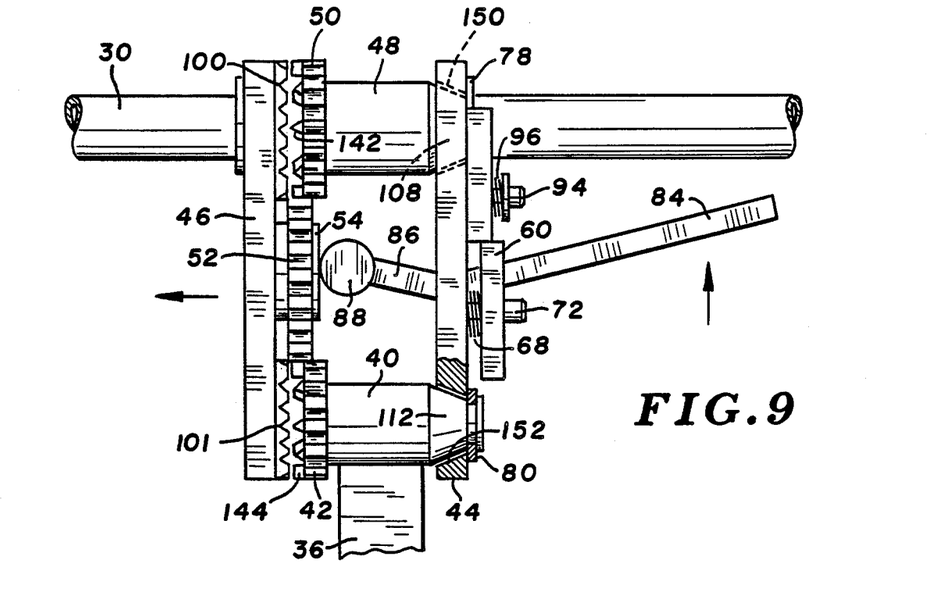
FIG. 9 a rear elevation of the mechanism in a release position and with certain parts removed.

Lever 82 is pivoted counterclockwise as viewed in FIG. 9 to release handlebars 30 for movement to a different setting. It is apparent from this figure, taken from the point of view of the operator behind the handlebars and steering column, that pivoting of lever 82 can be accomplished merely by extending the grasp of the fingers of the right hand from a position around the handlebars alone to a position around the handlebar and leg 84 of the lever. Pivoting of the lever drives pad 88 against center boss 54, forcing locking plate 46 and actuator plate 44 away from one another.

The operation of lever 82 to release handlebars 30 is seen in FIG. 9, in which the bolts and sleeves are removed to more clearly show the lever. The release occurs in two stages, each of which can be understood in connection with FIG. 9. In the first stage, lever 82 as it pivots acts primarily upon actuator plate 44, moving this plate axially with respect to hubs 40 and 48 to the right. As a result, tapers 108 and 112 of the respective hubs are separated from corresponding tapered openings 150 and 152 formed through the actuator plate. This "lost motion" stage continues until the actuator plate engages retaining rings 78 and 80, at which point the actuator plate can no longer move rightward relative to the hubs.

Continued counterclockwise pivoting of lever 82 urges locking plate 44 leftward relative to the hubs, against the force of springs 66 and 68, until locking projections 56 and 58 are free of locking gears 50 and 42, respectively as shown. So long as the operator maintains lever 82 in the position illustrated, handlebars 30 may be moved forwardly or rearwardly as desired, to a new setting. One advantage of the substantially matching profiles of locking teeth 142/144 and grooves 100/101 is that the operator, upon moving handlebars 30 at least near to the desired new setting, can release lever 82 and move the handlebars slightly. This causes an initial capture of the eight locking teeth of each gear by a corresponding set of eight grooves in each locking projection, followed by a rapid locking of the mechanism under the force of compression springs 66 and 68. This provides the operator with an excellent tactile sense that a new setting has been successfully achieved. Upon locking, detent 92 is no longer retained by plate 60 and reassumes its locking position.

Figure 10:
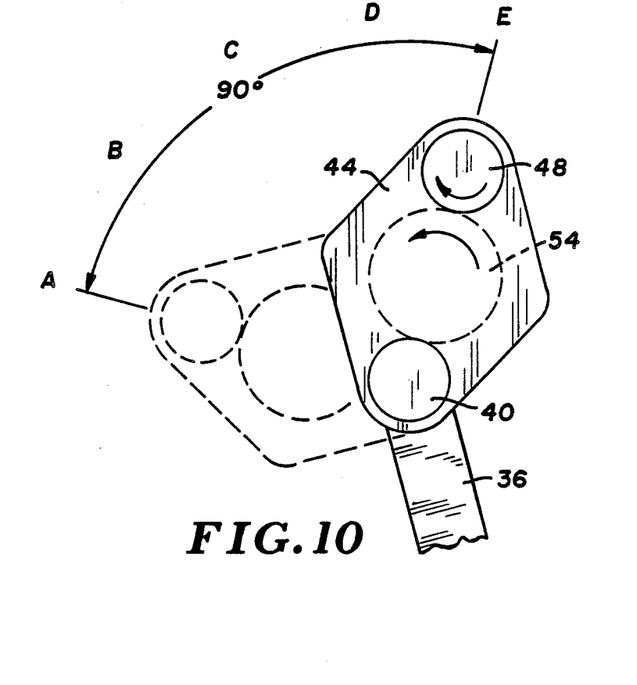
FIG. 10 is a schematic view illustrating a range of adjustment for the mechanism.

FIG. 10 illustrates a range of adjustment for handlebars 30, corresponding to 90° of pivoting for the locking and actuator plates relative to steering column 36. In the presently preferred arrangement, each locking projection includes sixteen symmetrically arranged locking grooves, resulting in an angular separation of 22.5° between each adjacent pair of grooves. As a result, the range illustrated encompasses five separate settings for the handlebars, designated A-E. Forward movement of upper hub 48, e.g. from position A to position E, involves vertical movement of the upper hub as well. However, the hub and handlebar orientation remains the same, as it does not rotate relative to the operator.

The upper hub orientation is preserved due to the driving connection of upper gear 50 with lower gear 42 through center gear 52. In particular, the lower locking gear is integral with steering column 36 and therefore rotates on a longitudinal axis with the steering column. However, as plates 44 and 46 are pivoted about a transverse axis from angular position A toward angular position E, center gear 52 rotates clockwise, also about a transverse axis, as viewed in FIG. 10. This causes a counterclockwise rotation in upper locking gear 50, again about a transverse axis. And, because the number of teeth 120 of upper gear 50 equals the number of teeth 122 of lower gear 42, rotation of center gear 52 results in an equal "rotation" of the upper and lower locking gears relative to the center gear. Upper locking gear 50 thus is indexed to the lower gear, i.e. rotated by the center gear at a rate which counterbalances the angular displacement of the locking and actuator plates.

Figure 11:
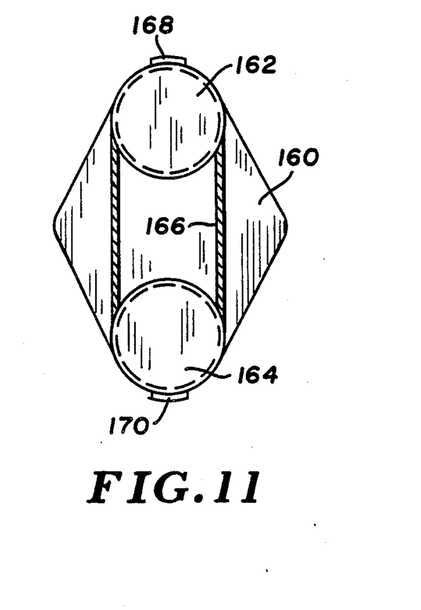
FIG. 11 illustrates an alternative embodiment of the steering control mechanism.

FIG. 11 schematically illustrates an alternative embodiment of the mechanism, in which a locking plate 160 has no center boss and no center gear. Rather, an upper hub 162 and a lower hub 164, both received rotationally through the locking plate, are maintained in a consistent angular relationship with one another by a cable 166 fastened to the upper hub as at 168 and to the lower hub as at 170. While not shown, locking projections with V-shaped grooves can be provided for engaging locking teeth integral with the hubs, as previously described, and in other respects this mechanism is substantially similar to that previously described. The cable alternative is preferred if low cost is the primary objective, but may be subject to longterm wear due to stretching of cable 166. The center gear approach is preferred when durability is the prime consideration.

Thus, in accordance with the present invention, the operator of a recreational vehicle can reset forwardly or rearwardly, the position of the handlebars without altering the handlebar orientation, even though the adjustment mechanism may comprise but a short portion of the effective steering column. The adjustment can be completed quickly and conveniently, merely by releasing the safety interlock with the thumb of one hand while pulling the actuating lever toward the handlebar with the fingers of the same hand. Proper realignment of locking teeth and locking grooves results in a rapid, positive re-engagement into lock at the reset position, without undue operator attention. The maintenance of consistent handlebar orientation, regardless of the handlebar position, preserves a comfortable gripping about the handlebars, and ensures that controls operable from the handlebar remain in their desired positions. Finally, any gauges mounted with respect to the handlebar retain their proper operator sight lines, to further enhance operator convenience.

What is claimed is:

1. An adjustable steering control apparatus for vehicles, including:
    a first elongate steering member disposed for rotation on a longitudinal axis;
    a second steering member mounted with respect to one end of said first steering member for pivoting relative to said first steering member about a transverse first axis;
    a third steering member rotatably mounted with respect to said second steering member about a transverse second axis parallel to said first axis relatively remote from said first steering member whereby said third steering member revolves about said first axis as said second steering member so pivots; and
    an indexing means for joining said first steering member and said third steering member in a manner to rotate said third steering member relative to the second steering member responsive to said pivoting of said second steering member, in a direction opposite to the direction of said pivoting and in an amount predetermined to maintain said third steering member in a selected orientation with respect to said first steering member as the third steering member revolves about the first axis; and
    a locking means, mounted to reciprocate with respect to said steering members in the direction of said transverse axes, for releasably securing said first, second and third steering members against movement relative to one another.

2. The apparatus of claim 1 wherein:
    said first steering member comprises a cylindrical first hub integral with a vehicle steering column and concentric on said first axis, said third steering member comprises a cylindrical second hub concentric on said second axis; and said second steering member has two spaced apart hub receiving openings formed therethrough, concentric on said first and second axes respectively, to receive said first and second hubs, respectively, for rotation relative to said second steering member.

3. The apparatus of claim 2 wherein:
said indexing means includes a first gear integral with and surrounding said first hub, a second gear integral with and surrounding said second hub, and an intermediate gear train for drivingly associating said first and second gears.

4. The apparatus of claim 3 wherein:
said intermediate gear train comprises a single intermediate gear in driving engagement with said first and second gears.

5. The apparatus of claim 4 wherein:
said indexing means includes a cable wrapped about said first hub and said second hub to drivingly associate said hubs.

6. The apparatus of claim 5 wherein:
said cable is fixed, along first and second portions of its length, to said first and second hubs, respectively.

7. The apparatus of claim 2 wherein:
said second steering member comprises an actuator plate;
said locking means comprises a locking plate disposed parallel to and spaced apart from said actuator plate, and first and second locking plate openings formed through said locking plate for receiving said first and second hubs, respectively, for rotation relative to said locking plate, and a plurality of locking grooves formed in said locking plate about said first locking plate opening;
a locking member integral with and surrounding said first hub, and a plurality of locking teeth formed in said locking member and projecting therefrom transversely toward said locking plate, said locking teeth positioned to enter said locking grooves responsive to transverse movement of said first hub and locking plate toward one another, thereby to secure said first hub and locking plate against rotation relative to one another; and
a biasing means for continually urging said first hub axially toward said locking plate, and a release actuator means for moving said first hub axially away from said locking plate against the force of said biasing means.

8. The apparatus of claim 7 further including:
a plurality of second locking grooves formed in said locking plate about said second locking plate opening;
a second locking member integral with and surrounding said second hub, and a plurality of second locking teeth formed in said second locking member and projecting transversely of the second locking member toward the locking plate;
said second locking teeth positioned to enter said second locking grooves responsive to axial movement of said second hub and locking plate toward one another, thereby to secure said second hub and said locking plate against rotation relative to one another; and
said first and second locking members being aligned with one another whereby said first locking teeth and grooves engage one another substantially simultaneously with the engagement of said second locking teeth and grooves.

9. The apparatus of claim 8 wherein:
said locking means further includes a retaining plate and a means for mounting said retaining plate with respect to said locking plate on the opposite side of said actuator plate, to move transversely with said locking plate;
said biasing means comprising a spring under compression between said guide plate and retaining plate, and said release actuator means including a lever mounted pivotally to said actuator plate and having one end engaged with said locking plate, whereby said lever is pivotable to move said locking plate with respect to said actuator plate; and
a hub connecting means for limiting the transverse travel of said actuator plate relative to said first and second hubs.

10. The apparatus of claim 9 wherein:
said hub connecting means includes first and second retaining rings mounted respectively to said first and second hubs and between said actuator plate and retaining plate, said retaining rings positioned to engage said actuator plate during its transverse movement away from said locking plate and thereby cause said hubs to move transversely with said actuator plate and relative to said locking plate, responsive to further actuator plate movement away from said locking plate.

11. The apparatus of claim 10 wherein:
said hub connecting means further includes first and second tapered surfaces in said first and second hubs, respectively, and converging in the transverse direction away from said locking plate, and first and second correspondingly tapered inside surfaces of said first and second hub receiving openings.

12. The apparatus of claim 9 further including:
a safety interlock means, mounted to said actuator plate for travel toward and away from an interlock position wherein said interlock means is between said actuator plate and retaining plate to prevent transverse movement of said actuator plate and retaining plate toward one another, and a biasing means for urging said interlock means into said interlock position.

13. An apparatus for adjustably positioning a steering control for a vehicle, said apparatus including:
a cylindrical first hub concentric on a first axis;
a steering member mounted with respect to said first hub for pivoting relative thereto about said first axis;
a second cylindrical hub concentric on a second axis parallel to said first axis and rotatably mounted with respect to said steering member about said second axis, whereby said second hub revolves about said first axis as said steering member pivots;
a first gear integral with and surrounding said first hub, a second gear integral with and surrounding said second hub, and an intermediate gear train for drivingly associating said first and second gears in a manner to rotate said second hub relative to said steering member responsive to said pivoting of said steering member, in a direction opposite to the direction of said pivoting and in an amount predetermined to maintain said second hub in a selected orientation with respect to said first hub as the second hub revolves about the first axis; and
a locking means mounted with respect to said steering member for releasably securing said first and second hubs and said steering member against movement relative to one another.

14. The apparatus of claim 13 wherein:
said intermediate gear train comprises a single intermediate gear in driving engagement with said first and second gears.

15. The apparatus of claim 14 wherein:
said first and second hubs have substantially the same diameter.

16. The apparatus of claim 13 wherein:
each of said first and second gears, and its associated one of said first and second hubs, together comprise a single, unitary member.

* * * * *

UNITED STATES PATENT AND TRADEMARK OFFICE
CERTIFICATE OF CORRECTION

PATENT NO. : 4,896,559

DATED : January 30, 1990

INVENTOR(S) : Gregory J. Marier/Tommy O. Moats

It is certified that error appears in the above-identified patent and that said Letters Patent is hereby corrected as shown below:

Column 10, line 7, "guide" should read -- actuator --.

Signed and Sealed this

Fourth Day of December, 1990

Attest:

HARRY F. MANBECK, JR.

*Attesting Officer*      *Commissioner of Patents and Trademarks*